(12) United States Patent
Zhao

(10) Patent No.: US 11,644,164 B2
(45) Date of Patent: May 9, 2023

(54) LIGHTING FIXTURE

(71) Applicants: SUZHOU OPPLE LIGHTING CO., LTD., Suzhou (CN); OPPLE LIGHTING CO., LTD., Shanghai (CN)

(72) Inventor: Yuxin Zhao, Shanghai (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 17/534,246

(22) Filed: Nov. 23, 2021

(65) Prior Publication Data
US 2022/0090748 A1 Mar. 24, 2022

Related U.S. Application Data

(63) Continuation of application No. PCT/CN2020/091157, filed on May 20, 2020.

(30) Foreign Application Priority Data

May 23, 2019 (CN) .......................... 201910436591.X
May 23, 2019 (CN) .......................... 201920751476.7

(51) Int. Cl.
F21S 8/00 (2006.01)
F21V 19/00 (2006.01)
(Continued)

(52) U.S. Cl.
CPC ................. F21S 8/03 (2013.01); F21S 8/026 (2013.01); F21V 19/001 (2013.01);
(Continued)

(58) Field of Classification Search
CPC ...... F21V 7/0008; F21V 7/0016; F21V 21/26; F21V 21/28; F21V 21/29; F21V 21/30;
(Continued)

(56) References Cited

U.S. PATENT DOCUMENTS 10,077,884 B2 * 9/2018 Di Trapani ............... F21V 9/02
10,174,890 B2 * 1/2019 Di Trapani ........ G02B 19/0066
(Continued)

FOREIGN PATENT DOCUMENTS

CN 102374437 A 3/2012
CN 107631213 A 1/2018
(Continued)

OTHER PUBLICATIONS

International Search Report of PCT Application No. PCT/CN2020/091157 dated Sep. 3, 2020 with English translation, (4p).

Primary Examiner — Colin J Cattanach
(74) Attorney, Agent, or Firm — Arch & Lake LLP

(57) ABSTRACT

A lighting fixture includes a housing, a first light source, a light guide plate, and a second light source. The housing has an inner cavity and a mounting hole, the mounting hole communicates the inner cavity with an external environment of the housing, the light guide plate is installed in the mounting hole. A side of the light guide plate faces the inner cavity, the other side of the light guide plate faces an outside of the housing. The second light source projects second light to the light guide plate, the second light is capable of being projected to the outside of the housing through the light guide plate. The first light source projects first light, and is configured such that the first light is projected to the outside of the housing through the light guide plate, and the housing is a non-light-transmitting housing.

19 Claims, 2 Drawing Sheets

(51) Int. Cl.

| | |
|---|---|
| *F21S 8/02* | (2006.01) |
| *F21Y 113/13* | (2016.01) |
| *F21V 21/04* | (2006.01) |
| *F21V 8/00* | (2006.01) |
| *F21V 21/29* | (2006.01) |
| *F21V 21/26* | (2006.01) |
| *F21V 7/00* | (2006.01) |
| *F21V 21/28* | (2006.01) |
| *F21V 21/30* | (2006.01) |

(52) U.S. Cl.
CPC .......... *F21V 7/0008* (2013.01); *F21V 7/0016* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/047* (2013.01); *F21V 21/048* (2013.01); *F21V 21/049* (2013.01); *F21V 21/26* (2013.01); *F21V 21/28* (2013.01); *F21V 21/29* (2013.01); *F21V 21/30* (2013.01); *F21V 2200/20* (2015.01); *F21Y 2113/13* (2016.08); *G02B 6/0075* (2013.01); *G02B 6/0076* (2013.01); *G02B 6/0081* (2013.01)

(58) Field of Classification Search
CPC .... F21V 2200/20; F21V 21/04; F21V 21/041; F21V 21/042; F21V 21/043; F21V 21/044; F21V 21/045; F21V 21/046; F21V 21/047; F21V 21/048; F21V 21/049; G02B 6/0075; G02B 6/0076; G02B 6/0081; F21S 8/026
See application file for complete search history.

(56) References Cited

U.S. PATENT DOCUMENTS

| | | | | |
|---|---|---|---|---|
| 10,533,728 | B2 * | 1/2020 | Yamauchi | G02F 1/133514 |
| 2006/0239025 | A1 * | 10/2006 | Azorin | G02B 6/0055 362/616 |
| 2007/0051883 | A1 * | 3/2007 | Rains | G09F 13/22 250/228 |
| 2008/0043466 | A1 * | 2/2008 | Chakmakjian | F21V 5/04 362/237 |
| 2010/0172152 | A1 * | 7/2010 | Boonekamp | F21V 13/08 362/609 |
| 2010/0254121 | A1 * | 10/2010 | Zhou | G02B 6/0055 362/147 |
| 2011/0044022 | A1 * | 2/2011 | Ko | G02B 19/0061 313/501 |
| 2013/0307420 | A1 * | 11/2013 | Yoder | F21V 33/006 315/307 |
| 2014/0133125 | A1 * | 5/2014 | Di Trapani | F21V 3/0615 362/2 |
| 2017/0051893 | A1 * | 2/2017 | Di Trapani | F21S 8/04 |
| 2017/0146204 | A1 * | 5/2017 | Di Trapani | G02B 19/0028 |
| 2018/0066826 | A1 * | 3/2018 | Di Trapani | F21V 7/0008 |
| 2018/0100634 | A1 * | 4/2018 | Hierzer | F21V 21/025 |
| 2018/0279454 | A1 * | 9/2018 | Takeshita | G03B 21/2033 |
| 2018/0345630 | A1 * | 12/2018 | Di Trapani | C03C 27/10 |
| 2019/0376664 | A1 * | 12/2019 | Ragazzi | F21S 10/00 |
| 2020/0233266 | A1 * | 7/2020 | Jiang | F21S 8/02 |

FOREIGN PATENT DOCUMENTS

| | | | | |
|---|---|---|---|---|
| CN | 207584545 U | | 7/2018 | |
| CN | 108758446 A | * | 11/2018 | |
| CN | 110160014 A | | 8/2019 | |
| CN | 209762961 U | | 12/2019 | |
| WO | WO-2015173770 A2 | * | 11/2015 | .......... A61N 5/0618 |
| WO | WO-2017003863 A1 | * | 1/2017 | ................ F21S 8/00 |

* cited by examiner

LIGHTING FIXTURE

CROSS-REFERENCE TO RELATED APPLICATIONS

The present application is a continuation application of PCT patent application No. PCT/CN2020/091157 filed on May 20, 2020 which claims priority of Chinese Patent Application No. 201910436591.X, filed on May 23, 2019, and Chinese Patent Application No. 201920751476.7, filed on May 23, 2019, and the entire disclosures of which are incorporated herein by reference herein for all purposes.

TECHNICAL FIELD

The present disclosure relates to a technical field of lighting equipment, and in particular, relates to a lighting fixture.

BACKGROUND

With the increase of user requirements, the performance of a lighting fixture continues to be optimized. At present, the function of the lighting fixture is not limited to lighting, and in many cases, the lighting fixture is also required to play a role in decorating the environment and adjusting the lighting environment.

Taking the particularity of the environments into consideration, many environments in our lives cannot receive natural light, such as an underground office and an office building with a dark environment. This environment is not conducive to people's work and life. The existing lighting fixtures can only achieve an ordinary lighting function and cannot provide the people with the effect of natural light irradiation. Therefore, the current lighting fixtures still have the problem of poor lighting effect.

SUMMARY

The present disclosure discloses a lighting fixture to solve the problem of poor lighting effect of the current lighting fixture.

In order to solve the above problem, the present disclosure adopts the following technical solutions:

A lighting fixture includes a housing, a first light source, a light guide plate, and a second light source. The housing has an inner cavity and a mounting hole, the mounting hole communicates the inner cavity with an external environment of the housing, the light guide plate is installed in the mounting hole, a side of the light guide plate faces the inner cavity, other side of the light guide plate faces an outside of the housing, the second light source projects second light to the light guide plate, the second light is capable of being projected to the outside of the housing through the light guide plate, the first light source projects first light, and is configured such that the first light is projected to the outside of the housing through the light guide plate, and the housing is a non-light-transmitting housing.

BRIEF DESCRIPTION OF THE DRAWINGS

The drawings described here are used for providing a further understanding of the present disclosure and constitute a portion of the present disclosure. The illustrative embodiments of the present disclosure and descriptions of the illustrative embodiments are used for explaining the present disclosure and do not constitute an improper limitation of the present disclosure. In the drawings.

DETAILED DESCRIPTION

Figure 1:
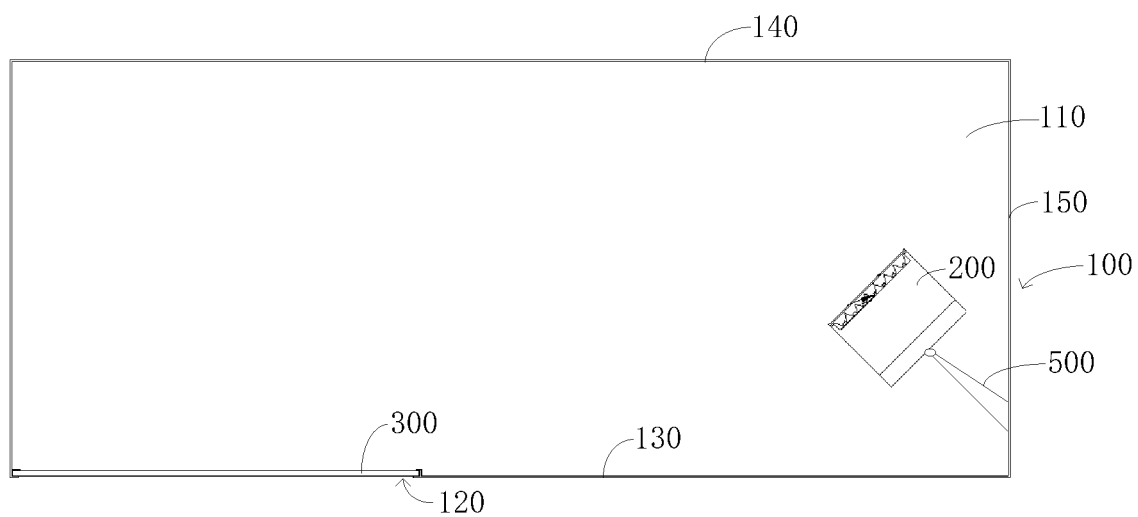
FIG. 1 is a schematic structural diagram of a lighting fixture disclosed by an embodiment of the present disclosure.

In order to make the objects, technical solutions, and advantages of the present disclosure clearer, the technical solutions of the present disclosure will be clearly and completely described below in combination with specific embodiments of the present disclosure and the corresponding drawings. Obviously, the described embodiments are only a portion of embodiments of the present disclosure, rather than all embodiments of the present disclosure. Based on the embodiments of the present disclosure, all other embodiments obtained by those of ordinary skill in the art without any creative work will fall within the protection scope of the present disclosure.

The technical solutions disclosed in various embodiments of the present disclosure will be described in detail below with reference to the accompanying drawings.

Referring to FIG. 1~FIG. 4, embodiments of the present disclosure disclose a lighting fixture, and the lighting fixture disclosed includes a housing 100, a first light source 200, a light guide plate 300, and a second light source 400.

The housing 100 is a basic component of the lighting fixture, and the housing 100 provides an installation foundation for other components of the lighting fixture. The housing 100 may generally be made of a polymer material, and because the density of the polymer material is low, it is beneficial to reduce the weight of the lighting fixture. In one or more examples, considering the heat dissipation performance, the housing 100 may also be made of a metal material with good heat dissipation performance, such as aluminum. The embodiments of the present disclosure do not limit the specific material of the housing 100.

The housing 100 has an inner cavity 110 and a mounting hole 120, the mounting hole 120 communicates the inner cavity 110 with an external environment of the housing 100, and the light guide plate 300 plays a role in guiding the light and is installed in the mounting hole 120. Because the mounting hole 120 communicates with the external environment of the housing 100, after the light guide plate 300 is installed in the mounting hole 120, a surface of the light guide plate 300 facing the outside of the housing 100 can serve as a part of the exterior surface of the lighting fixture.

The first light source 200 and the second light source 400 are mounted on the housing 100, the first light source 200 projects first light A, and the second light source 400 projects second light B. The first light source 200 projects the first light A, and is configured such that the first light A is projected to the outside of the housing 100 through the light guide plate 300. The second light B projected by the second light source 400 to the light guide plate 300 is capable of being projected to the outside of the housing 100 through the light guide plate 300, that is, the first light A and the second light B can be projected to the outside of the housing 100 after being transmitted by the light guide plate 300.

In the embodiments of the present disclosure, the housing 100 is a non-light-transmitting housing, which can prevent ambient light outside the housing 100 from passing through the housing 100 and causing interference. Specifically, after the housing 100 is made of a light-transmitting material, a layer of light-shielding paint is coated to the inner surface of the housing 100 to achieve the non-light-transmitting characteristic of the housing 100. In one or more examples, the housing 100 may also be directly made of a non-light-transmitting material. The embodiments of the present disclosure do not limit the implementation of the non-light-transmitting characteristic of the housing 100.

In the lighting fixture disclosed in the embodiment of the present disclosure, the first light source 200 and the second light source 400 respectively emit the first light A and the second light B, and both the first light A and the second light B can be projected to the outside of the housing 100 after being light-guided by the light guide plate 300, so that the lighting fixture can emit the first light A and the second light B at the same time. In this case, the first light A and the second light B can be background light for each other, and furthermore, the light can be projected from an environment with a brighter background, which is similar to feeling the light in the daytime, thereby improving the lighting effect of the lighting fixture and improving the performance of the lighting fixture.

The light guide plate 300 can have a variety of structures. Generally, the light guide plate 300 includes a plurality of surfaces. The first light A emitted by the first light source 200 and the second light B emitted by the second light source 400 can be incident on the same surface of the light guide plate 300 and then be emitted to the outside of the housing 100 from the other surface of the light guide plate 300. In order to better reflect the difference in lighting effect between the first light A and the second light B, in a more preferred solution, the first light source 200 and the second light source 400 respectively project the first light A and the second light B to different light incident surfaces of the light guide plate 300, and the first light A and the second light B are emitted to the outside of the housing 100 through the same light emitting surface of the light guide plate 300. It should be noted that the light incident surface and the light emitting surface are different surfaces of the light guide plate 300 respectively.

Referring to FIG. 1 again, the light guide plate 300 includes a first plate surface 310, a second plate surface 320, and a side surface 330, the first plate surface 310 faces to the inner cavity 110, the second plate surface 320 faces to the outside of the housing 100, and the side surface 330 connects the first plate surface 310 and the second plate surface 320. The first light source 200 projects the first light A to the first plate surface 310, and the second light source 400 projects the second light B to the side surface 330, that is, the first plate surface 310 and the side surface 330 are different light incident surfaces of the light guide plate 300 respectively. The first light A and the second light B are emitted from the second plate surface 320 to the outside of the housing 100, and the second plate surface 320 is the light emitting surface of the light guide plate 300. In this case, the second light B enters the light guide plate 300 from the side surface 330 and then is emitted from the light guide plate 300, so as to facilitate the formation of a brighter environment. The first light A enters the light guide plate 300 from the first plate surface 310 and then is emitted from the second plate surface 320, thereby easily forming a differentiated lighting effect, so as to achieve a better lighting effect.

In order to improve the projection effect, the second light source 400 is arranged on a side of the side surface 330, so that the second light B is more easily projected to the light guide plate 300 from the side surface 330. In a preferred solution, the second light source 400 may be symmetrically arranged on both sides of the light guide plate 300. In one or more examples, the second light source 400 may also be arranged around the side surface 330. Such an arrangement of the second light source 400 can undoubtedly project the second light B to the side surface 330 from various directions, so as to achieve better projection of the second light B.

Figure 2:
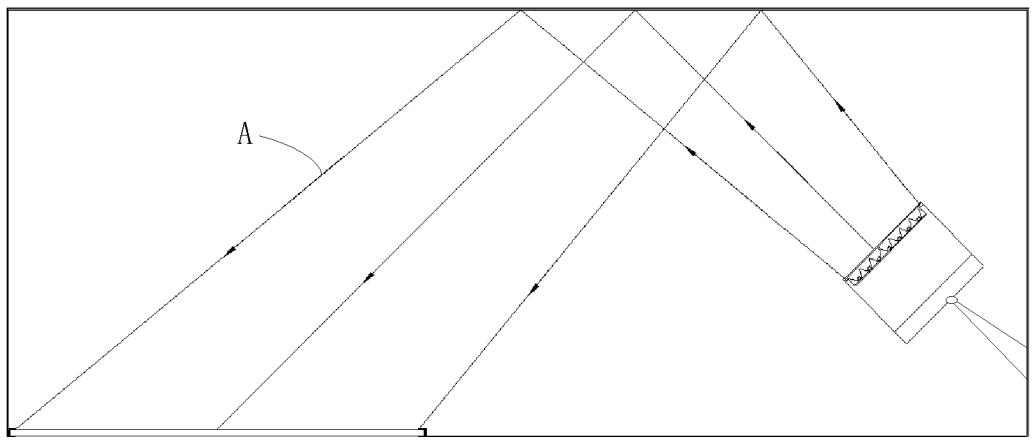
FIG. 2 is a schematic diagram of light emission of a lighting fixture disclosed by an embodiment of the present disclosure.
Figure 3:
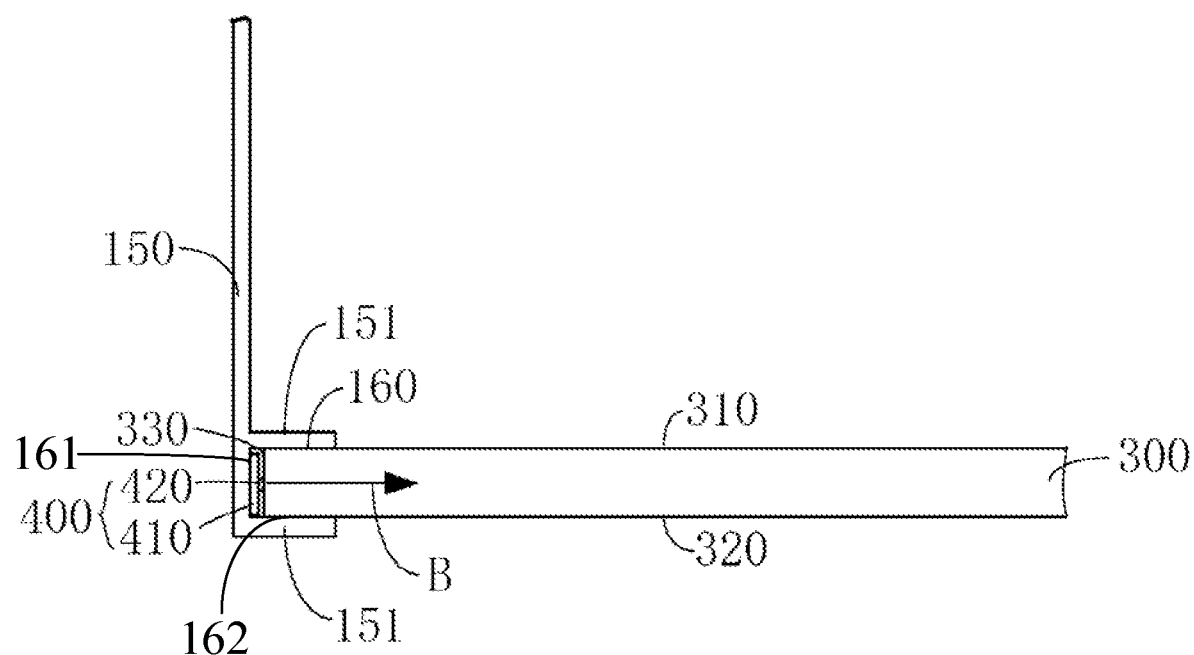
FIG. 3 is a partial enlarged schematic structural diagram of the FIG. 1.
Figure 4:
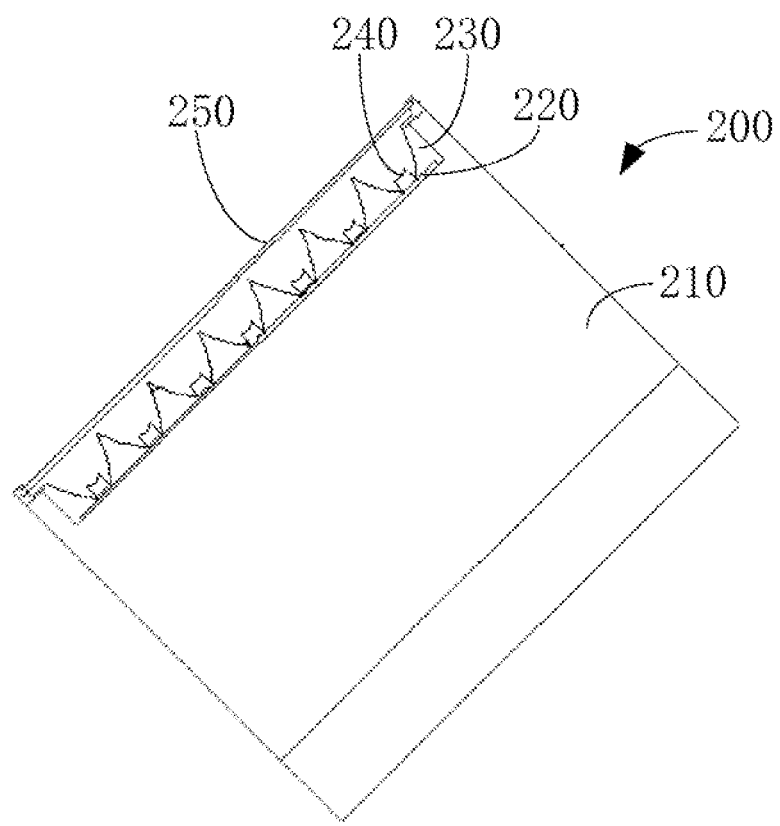
FIG. 4 is a schematic structural diagram of a light source of a lighting fixture disclosed by an embodiment of the present disclosure.

Referring to FIG. 1~FIG. 4 again, in the embodiments of the present disclosure, the structure of the housing 100 may be various. In a specific embodiment, the housing 100 includes a bottom wall 130, a top wall 140, and a side wall 150, the side wall 150 is usually a cylindrical structure, the side wall 150 is connected between the bottom wall 130 and the top wall 140, and the bottom wall 130, the top wall 140, and the side wall 140 surround to form the inner cavity 110 of the housing 100.

In some examples, the mounting hole 120 may be provided in the bottom wall 130. Alternatively or additionally, the mounting hole 120 may be formed by butting the side wall 150 and the bottom wall 130. The arrangement position of the above-mentioned mounting hole 120 can enable the lighting fixture to project light in a downward direction. The embodiments of the present disclosure do not limit the specific forming method and arrangement position of the mounting hole 120.

Referring to FIG. 1~FIG. 3, a notch is provided at an end of the bottom wall 130, the notch and the side wall 150 form the mounting hole 120, and the first light source 200 is obliquely arranged between the other end of the bottom wall 130 and the top wall 140. It should be noted that the light projection direction of the first light source 200 has an angle with the side wall 150. Specifically, the first light source 200 obliquely projects the first light A to the light guide plate 300 directly, or the first light A is indirectly projected onto the light guide plate 300 after being reflected.

Specifically, a mounting groove 160 is provided on an inner wall of the mounting hole 120, and an edge of the light guide plate 300 is inserted into the mounting groove 160, so as to achieve the detachable installation of the light guide plate 300 in the mounting hole 120. This assembling method is easier to achieve to disassemble and assemble the light guide plate 300, which is beneficial to the replacement of the light guide plate 300.

Referring to FIG. 3 again, two sheet-like structure members 151 that are parallel are provided on an inner surface of the side wall 150, the two sheet-like structure members 151 and the inner surface of the side wall 150 form a first sub-groove 161, a second sub-groove 162 is provided on the inner wall of the notch, and the first sub-groove 161 and the second sub-groove 162 are butted to form the mounting groove 160 surrounding the light guide plate 300. In a case where the mounting hole 120 is completely provided on the bottom wall 130, the mounting groove 160 may be set in the inner wall of the mounting hole 120.

As mentioned above, the second light source 400 is arranged on one side of the side surface 330. Under the premise of having the mounting groove 160, the second light source 400 is arranged between the side surface 330 and a bottom surface of the mounting groove 160, so that the mounting groove 160 for installing the light guide plate 300 can be fully utilized to achieve the installation of the second light source 400, and finally a more compact assembly can be achieved.

The structure of the second light source 400 may be various. In a specific implementation, the second light source 400 may include a circuit board 410 attached to the bottom surface of the mounting groove 160 and a luminous body 420 that is installed on the circuit board 410 and projects the second light B to the side surface 330. The number of the luminous bodies 420 may be at least two, and the luminous bodies 420 may be distributed along the side surface 330. The second light source 400 with the above structure can undoubtedly be achieved to be installed in the mounting groove 160, and it is easier to form the second light B that is projected to the side surface 330 from a plurality of directions.

The circuit board 410 may be a rigid circuit board or a flexible circuit board. The luminous body 420 is preferably an LED luminous body, and the LED luminous body has the advantages of less heat generation, longer life, and the like.

In the lighting fixture disclosed in the embodiments of the present disclosure, the mounting hole 120 may occupy a certain space of the bottom wall 130. Specifically, the ratio of the area of the mounting hole 120 to the area of the bottom wall 130 may be 1:1.5~1:3. Of course, the embodiments of the present disclosure do not limit the specific size of the mounting hole 120.

As described above, the first light source 200 is disposed in the inner cavity 110 and directly projects the first light A to the light guide plate 300. In one or more examples, the first light A emitted by the first light source 200 may also be projected onto the light guide plate 300 after being reflected. Based on this, in a preferred solution, at least a part of the inner surface of the top wall 140 is a reflective surface. The reflective surface receives the first light A projected by the first light source 200 and reflects the first light A to the light guide plate 300. Specifically, all the inner surface of the top wall 140 is a reflective surface, so that it is beneficial for the first light source 200 to adjust the projection angle more flexibly, and at the same time, it is beneficial to avoid a vision difference caused by a part of the inner surface of the top wall 140 being a reflective surface and other parts being not reflective surface.

In one or more examples, further, a reflective film or a reflective plate may be provided on the inner surface of the top wall 140, at least part of the surface of the reflective film or the reflective plate facing to the bottom wall 130 is a reflective surface, and the reflective surface receives the first light A projected by the light source 200 and reflects the first light A to the light guide plate 300.

In order to improve the lighting effect of the first light A, a reflectivity of the reflective surface may be greater than 85%, for example, the reflectivity of the reflective surface may be greater than 85% and less than 95%.

In order to achieve a better lighting effect, in the lighting fixture disclosed in the embodiments of the present disclosure, the color of the first light A and the color of the second light B are different. Under the premise that the colors are different, the cooperation of the first light A and the second light B can form a better lighting effect.

In a more preferred solution, the first light A may be white light, the second light B may be blue light, the second light B is projected onto the light guide plate 300 and then is emitted, the blue light is transmitted in the light guide plate 300 to form a blue background environment, the white light is projected to the light guide plate 300 and is projected out from the light guide plate 300, and in this case, it can be similar to the sunlight under the blue sky, so as to better imitate the effect of natural light.

In one or more examples, the first light A and the second light B may be different in at least one aspect of a group consisting of the projection direction, color temperature, and brightness. The above-mentioned parameters of the first light A and the above-mentioned parameters of the second light B may also be the same, and other parameters of the first light A and the second light B are different, as long as the first light A and the second light B can be background for each other, so that the user can feel the difference in light projection.

In order to make the light projection of the first light A and the second light B more uniform, in a more preferred solution, the light guide plate 300 may be a nano light guide plate. The nano light guide plate includes discretely distributed nanoparticles, and the nanoparticles can better disperse the first light A and the second light B, thereby achieving a better uniform light effect.

The structure of the first light source 200 may be various. Please refer to FIG. 4 again, in a specific implementation manner, the first light source 200 may include a base substrate 210, a circuit board 220, a light distribution component 230, and at least two luminous bodies 240 distributed in an array.

The base substrate 210 is the foundation of the first light source 200 and provides a mounting position for the circuit board 220. The circuit board 220 is arranged on the base substrate 210, the luminous bodies 240 are arranged on the circuit board 220, so as to be powered by the circuit board 220. The light distribution component 230 is arranged opposite to the luminous bodies 240 and is used for distributing light to the luminous bodies 240. After the at least two luminous bodies 240 distribute light through the light distribution component 230, the at least two luminous bodies 240 can project the first light A. Specifically, the at least two luminous bodies 240 distributed in an array make it easier for the first light A to be a group of light rays that are close to parallel to each other, thereby helping to improve the lighting effect of the first light A.

In a preferred solution, the base substrate 210 may adopt a base with good heat dissipation performance, such as a metal base, which can better achieve heat dissipation during the working process of the first light source 200.

In order to improve the projection effect of the first light A, the first light source 200 may further include a diffusion device 250 covering the luminous bodies 240. The diffusion device 250 can make the first light A more dispersed, thereby improving the uniformity of illumination. Specifically, the diffusion device 250 may be a diffusion film, a diffusion plate, a frosted plate, etc. The embodiments of the present disclosure do not limit the specific type of the diffusion device 250.

The lighting fixture disclosed in the embodiments of the present disclosure may further include a mounting bracket 500, and the first light source 200 may be installed in the inner cavity 110 through the mounting bracket 500. Specifically, the first light source 200 may be supported on the side wall 150 by the mounting bracket 500 or may be supported on the bottom wall 130 by the mounting bracket 500.

In a more preferred solution, one end of the mounting bracket 500 is fixed in the inner cavity 110, and the first light source 200 is hinged to the other end of the mounting bracket 500, so as to be able to rotate relative to the mounting bracket 500, thereby enabling to flexibly adjust a projection angle of the light.

The technical solutions adopted by the present disclosure can achieve the following beneficial effects.

In the lighting fixture disclosed by the present disclosure, the first light source and the second light source respectively emit the first light and the second light, and both the first light and the second light can be light-guided by the light guide plate and then projected to the outside of the housing, so that the lighting fixture can emit the first light and the second light at the same time. In this case, the first light and the second light can be background light for each other, and furthermore, the light can be projected from an environment with a brighter background, which is similar to feeling the light in the daytime, thereby improving the lighting effect of the lighting fixture and improving the performance of the lighting fixture.

The above embodiments of the present disclosure focus on the differences between the various embodiments, as long as the different optimization features between the various embodiments are not contradictory, the different optimization features can be combined to form better embodiment(s). Considering the conciseness of the text, the details will not be repeated herein.

The above descriptions are only embodiments of the present disclosure, and are not intended to limit the present disclosure. For those skilled in the art, the present disclosure may have various modifications and changes. Any modification, equivalent replacement, improvement, etc. made within the spirit and principle of the present disclosure will be included in the scope of the claims of the present disclosure.

The invention claimed is:

1. A lighting fixture, comprising:
a housing,
comprising an inner cavity and a mounting hole, the mounting hole communicates the inner cavity with an external environment of the housing, wherein the housing is a non-light-transmitting housing;
a light guide plate installed in the mounting hole, wherein a side of the light guide plate faces the inner cavity, and another side of the light guide plate faces an outside of the housing;
a first light source that projects first light, wherein the first light is projected to the outside of the housing through the light guide plate; and
a second light source that projects second light to the light guide plate, wherein the second light is capable of being projected to the outside of the housing through the light guide plate, wherein the second light source is disposed between a side surface of the light guide plate and a mounting groove, and wherein the mounting groove is disposed on an inner wall of the mounting hole,
wherein the housing comprises a bottom wall, a top wall, and a side wall connected between the bottom wall and the top wall, and an outer surface of the side wall is in direct communication with the external environment of the housing;
wherein a notch is located at an end of the bottom wall, the notch and the side wall form the mounting hole; and
wherein two sheet-like structure members that are parallel are located on an inner surface of the side wall, the two sheet-like structure members and the inner surface of the side wall form a first sub-groove as an integral structure, a second sub-groove is located on an inner wall of the notch, the first sub-groove and the second sub-groove are butted to form the mounting groove surrounding the light guide plate, and the two sheet-like structure members are in direct contact with the light guide plate.

2. The lighting fixture according to claim 1, wherein the first light source and the second light source respectively project the first light and the second light onto different light incident surfaces of the light guide plate, and the first light and the second light are emitted to the outside of the housing through a same light emitting surface of the light guide plate.

3. The lighting fixture according to claim 2, wherein the light guide plate comprises a first plate surface; a second plate surface, and the side surface, and the first plate surface faces to the inner cavity;
the second plate surface faces to the outside of the housing, and the side surface connects the first plate surface and the second plate surface; and
the first light source projects the first light to the first plate surface, and the second light source projects the second light to the side surface, and the first light and the second light are emitted from the second plate surface to the outside of the housing.

4. The lighting fixture according to claim 3, wherein the second light source is arranged on at least a side of the side surface.

5. The lighting fixture according to claim 4, wherein the second light source is arranged around the side surface.

6. The lighting fixture according to claim 3, wherein the bottom wall, the top wall, and the side wall surround to form the inner cavity of the housing, and the mounting hole is formed by butting the side wall and the bottom wall.

7. The lighting fixture according to claim 6, wherein the first light source is obliquely arranged between another end of the bottom wall and the top wall.

8. The lighting fixture according to claim 7, wherein an edge of the light guide plate is inserted into the mounting groove.

9. The lighting fixture according to claim 8, wherein the second light source is arranged between the side surface and a bottom surface of the mounting groove.

10. The lighting fixture according to claim 9, wherein the second light source comprises a circuit board attached to the bottom surface of the mounting groove and a luminous body that is installed on the circuit board and projects the second light to the side surface.

11. The lighting fixture according to claim 1, wherein the bottom wall, the top wall, and the side wall surround to form the inner cavity of the housing, and the mounting hole is formed by butting the side wall and the bottom wall.

12. The lighting fixture according to claim 11, wherein a ratio of an area of the mounting hole to an area of the bottom wall is 1:1.5~1.3.

13. The lighting fixture according to claim 11, wherein at least a part of an inner surface of the top wall is a reflective surface, and the reflective surface receives the first light projected by the first light source and reflects the first light to the light guide plate.

14. The lighting fixture according to claim 11, wherein a reflective film or a reflective plate is provided on an inner surface of the top wall, at least part of a surface of the reflective film or the reflective plate facing to the bottom wall is a reflective surface, and the reflective surface receives the first light projected by the light source and reflects the first light to the light guide plate.

15. The lighting fixture according to claim 13, wherein a reflectivity of the reflective surface is greater than 85%.

16. The lighting fixture according to claim 1, wherein a color of the first light and a color of the second light are different.

17. The lighting fixture according to claim 16, wherein the first light is white light, and the second light is blue light.

18. The lighting fixture according to claim 1, wherein the first light source comprises a base substrate, a circuit board, a light distribution component, and at least two luminous bodies distributed in an array, the circuit board is arranged on the base substrate, the luminous bodies are arranged on the circuit board, and the light distribution component is arranged opposite to the luminous bodies and is used for distributing light to the luminous bodies.

19. The lighting fixture according to claim 18, wherein the first light source further comprises a diffusion device covering the luminous bodies.

\* \* \* \* \*